United States Patent
Bessems et al.

(10) Patent No.: US 12,309,660 B2
(45) Date of Patent: May 20, 2025

(54) SYSTEMS AND METHODS FOR LAYERED DATA REPORTING IN AN ATTRACTION

(71) Applicant: Universal City Studios LLC, Universal City, CA (US)

(72) Inventors: Ron Bessems, Hobe Sound, FL (US); Patrick John Goergen, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 388 days.

(21) Appl. No.: 17/731,584

(22) Filed: Apr. 28, 2022

(65) Prior Publication Data
US 2022/0360938 A1 Nov. 10, 2022

Related U.S. Application Data

(60) Provisional application No. 63/184,892, filed on May 6, 2021.

(51) Int. Cl.
*H04W 4/021* (2018.01)

(52) U.S. Cl.
CPC .................. *H04W 4/021* (2013.01)

(58) Field of Classification Search
CPC ..... H04W 76/22; H04W 36/12; H04W 36/38; H04W 76/10; H04W 76/11; H04W 36/00; H04W 36/0011; H04W 52/0225; H04W 52/0216; H04W 52/02; Y02D 30/70
See application file for complete search history.

(56) References Cited

U.S. PATENT DOCUMENTS

| | | | |
|---|---|---|---|
| 6,179,619 B1 * | 1/2001 | Tanaka | A63G 7/00 472/60 |
| 6,796,908 B2 * | 9/2004 | Weston | A63G 7/00 472/60 |
| 8,978,034 B1 | 3/2015 | Goodson et al. | |
| 10,419,465 B2 | 9/2019 | Muddu et al. | |
| 10,814,236 B1 * | 10/2020 | Dagley | A63G 7/00 |
| 10,828,573 B1 * | 11/2020 | Kalama | A63F 13/235 |

(Continued)

FOREIGN PATENT DOCUMENTS

| | | | | |
|---|---|---|---|---|
| ES | 2942279 T3 * | 5/2023 | | A63G 25/00 |
| WO | WO-2022133330 A1 * | 6/2022 | | B22F 10/70 |

OTHER PUBLICATIONS

PCT/US2022/027474 International Search Report and Written Opinion mailed Aug. 10, 2022.

*Primary Examiner* — Nathan S Taylor
(74) *Attorney, Agent, or Firm* — Fletcher Yoder, PC

(57) ABSTRACT

A layered reporting system for an attraction may include a primary and secondary wireless communication network that are separate from one another. Components of an attraction environment, such as augmented reality/virtual reality headsets and a ride vehicle having a controller, may generate operation data of the attraction. The components of the systems may also include communication circuitry that communicates a first subset of the operation data to the primary wireless network. A second subset of the operation data is communicated via a secondary wireless network having a bandwidth higher than the primary wireless network.

21 Claims, 4 Drawing Sheets

(56) References Cited

U.S. PATENT DOCUMENTS

| | | | |
|---|---|---|---|
| 2013/0244801 A1* | 9/2013 | Frolov | A63G 3/02 |
| | | | 472/61 |
| 2013/0285855 A1* | 10/2013 | Dupray | H04W 4/021 |
| | | | 342/451 |
| 2014/0036742 A1* | 2/2014 | Charbit | H04W 72/1263 |
| | | | 370/280 |
| 2015/0282080 A1* | 10/2015 | Maattanen | H04W 76/28 |
| | | | 370/311 |
| 2018/0253905 A1* | 9/2018 | McCracken | A63F 13/25 |
| 2018/0300098 A1* | 10/2018 | Vembar | G06F 3/1431 |
| 2019/0004598 A1* | 1/2019 | Gordt | A63G 7/00 |
| 2019/0212153 A1* | 7/2019 | Adireddy | G08G 1/0112 |
| 2019/0215870 A1* | 7/2019 | Babaei | H04L 5/0092 |
| 2019/0351340 A1* | 11/2019 | Goergen | G06F 9/54 |
| 2019/0369607 A1 | 12/2019 | Enver et al. | |
| 2019/0394082 A1* | 12/2019 | Cirik | H04W 76/28 |
| 2021/0205999 A1* | 7/2021 | Mecca | G06T 7/73 |
| 2021/0268393 A1* | 9/2021 | Smith | A63G 33/00 |
| 2021/0279893 A1* | 9/2021 | Iwanowski | G06V 10/143 |
| 2021/0294837 A1* | 9/2021 | Ensing | G06F 16/532 |
| 2021/0410107 A1* | 12/2021 | Park | H04W 76/27 |
| 2022/0188563 A1* | 6/2022 | Baughman | G06F 18/231 |
| 2022/0197306 A1* | 6/2022 | Cella | G06N 3/088 |
| 2022/0217317 A1* | 7/2022 | Xu | H04N 13/156 |
| 2022/0232121 A1* | 7/2022 | Lofton | H04W 4/48 |
| 2022/0383771 A1* | 12/2022 | Alexander | G09B 5/065 |
| 2023/0106065 A1* | 4/2023 | Onuki | H10B 63/30 |
| | | | 257/421 |
| 2023/0171698 A1* | 6/2023 | Wei | H04W 72/23 |
| | | | 370/318 |
| 2023/0328840 A1* | 10/2023 | Cheng | H04W 8/005 |
| | | | 370/329 |
| 2023/0342511 A1* | 10/2023 | Wodrich | G06T 19/006 |

* cited by examiner

SYSTEMS AND METHODS FOR LAYERED DATA REPORTING IN AN ATTRACTION

CROSS-REFERENCE TO RELATED APPLICATIONS

This application claims priority to and the benefit of U.S. Provisional Application No. 63/184,892, filed May 6, 2021, and entitled "SYSTEMS AND METHODS FOR LAYERED DATA REPORTING IN AN ATTRACTION," the disclosure of which is incorporated by reference in its entirety for all purposes.

FIELD OF DISCLOSURE

The present disclosure relates generally to data gathering and reporting for elements of an attraction, e.g., an amusement attraction. More specifically, embodiments of the present disclosure relate to systems and methods for communicating data related to an attraction in separate communication networks or layers according to data type.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement or theme park generally includes a variety of entertainment systems or attractions that provide a unique experience for guests of the amusement park. For example, the amusement park may include different attraction systems, such as a roller coaster, a drop tower, a water ride, dark ride and so forth. Some attraction systems may include an environment with animated figures and special effects, which help immerse guests in the experience of the attraction system. However, installation and configuration of the features may be difficult, and it may be challenging to monitor different installed features that provide data in real time using different formats and of different complexity. Therefore, improved features and techniques are useful to handle ride and attraction data more efficiently to provide a desirable effect or experience for the guests.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a data reporting system for an attraction may include a primary wireless communication network, a secondary wireless communication network, and a ride vehicle of the attraction. The data reporting system for the attraction may also include a controller of the ride vehicle configured to provide ride vehicle operation data indicative of characteristics of the ride vehicle during operation, and communication circuitry that communicates a first subset of the ride vehicle operation data to the primary wireless network and a second subset of the ride vehicle operation data to the secondary wireless network, where the first subset of the ride vehicle operation data is at a lower bandwidth than the second subset of the ride vehicle operation data In one embodiment, a data reporting system for an attraction may include a ride vehicle having a sensor configured to generate position information of the ride vehicle in the attraction, a vehicle controller configured to generate a log data of ride vehicle operations, and communication circuitry that communicates the positon information via a primary wireless communication network and the log data via a secondary wireless communication network. The data reporting system may also include a server that is configured to receive the position information from the primary wireless communication network and the log data from the secondary wireless communication network and to combine the position information and the log data.

In one embodiment, a method includes a data reporting system generating operation data of an attraction, communicating a first subset of the operation data in real-time via a restricted wireless network, determining a status of the attraction, and selectively communicating a second subset of the operation data via a secondary wireless network based on the status of the attraction being indicative of a time between cycles of the attraction.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
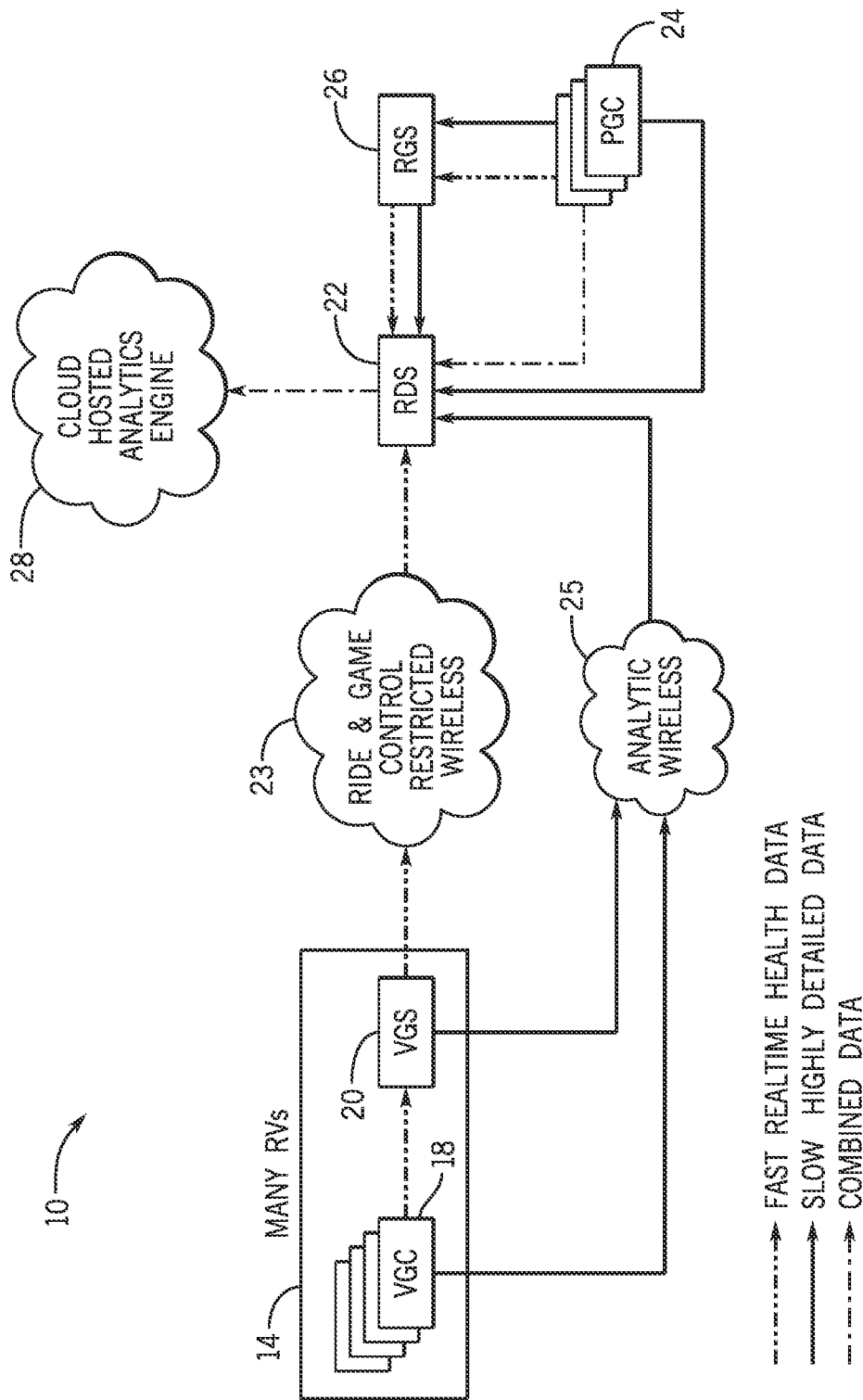
FIG. 1 is a block diagram of a layered reporting system for an attraction, in accordance with techniques described in the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The present disclosure is directed to a layered reporting system that may be implemented with amusement park attractions including shows, rides, promotions, and so forth. As provided herein, a layered reporting system facilitates intake, communication, processing and/or analysis, and storage of data of various components of an attraction, e.g., an amusement attraction. The data can relate to audio, visual, and physical effects that can be experienced by riders in a vehicle, as well as features of a game, including player interaction with the various game effects and dynamic experiences based on the interaction. Riders may also be equipped with a virtual reality/augmented reality (AR/VR) headset with additional features to provide a more immersive experience. These attraction components generate respective operation data, and some of the operation data can be considered "fast" data that is communicated quickly, e.g., close to or in real time, to a controller to permit feedback actions based on analysis of the data.

In one embodiment, one or more components of the layered reporting system may generate, collect, and publish or transmit real-time fast operation data (e.g., health data) relating to the status of the one or more components during operation of the ride. For example, ride vehicle operation data may include, but is not limited to, operation status, malfunction identification, position data, speed, status of riders, sensor measurements, or status of coupled devices such as headsets. Thus, the higher priority fast data may be structured to facilitate faster communication and may be compressed, communicated at lower bandwidth, and/or or transmitted on access-restricted communication pathways that are dedicated to fast data communication. The operation data also includes "slow" data that is lower priority and that can be communicated at higher bandwidths to include more information. The slow data may be communicated in real-time or may be batch communicated on a separate communication pathway to the fast data.

While fast data and slow data are communicated via separate pathways, the fast data and the slow data may have one or more common destinations and may be jointly provided to particular processing and/or storage layers. Accordingly, provided herein are layered data reporting techniques that provide attraction operation information and analytics at varying levels of detail and accuracy depending on the desired result. Real-time fast data, without any real-time slow data, can be fed into safety analytics to permit the attraction controller to respond quickly to deviations in ride vehicle positions or to vehicle shutdowns while the ride is operational. In addition, the real-time fast data may enable the attraction controller to modify a current loading decision based on the real-time fast data. For example, the real-time fast data may indicate that a ride vehicle may only be able to accommodate fewer riders than normal. Thus, the attraction controller may provide instructions to one or more team members to modify the current loading procedure to account for the change in capacity for the ride vehicle. Accordingly, the fast data may be time-sensitive data that is both communicated during and, in embodiments, acted on in real-time while the ride is in operation. The real-time fast data is communicated via a dedicated communication pathway to avoid bottlenecks or slowdowns that may be associated with slower and higher bandwidth data. More highly detailed operation slow data can be combined with the fast data at one or more analytics layers that model past rides, identify baseline values/trends and spot outliers, as well as predict if performance metrics might become outliers to facilitate pre-emptive maintenance and improve attraction uptime and guest show performance.

With the foregoing in mind, FIG. 1 illustrates an embodiment of a layered reporting system 10 in accordance with the present disclosure. The layered reporting system 10 may be implemented to report data generated in an attraction environment through one or more client layers, one or more server layers, one or more wireless network communication layers, and one or more storage layers. As illustrated, the attraction environment includes one or more ride vehicles 14 that respectively include vehicle game clients 18 that receive vehicle operation data from one or more hardware or software elements of the ride vehicle 14.

The vehicle game clients 18 may be implemented as hardware or software as provided herein, and operate to communicate with one or more servers, e.g., a vehicle game server 20. The one or more vehicle game clients 18 may include components, discussed further below, that are configured to collect and publish or communicate ride vehicle operation data to the vehicle game server 20 via the primary wireless network 23. The ride vehicle operation data may include, but is not limited to, power levels, test logs, malfunction data, etc. In some embodiments, certain high priority ride vehicle operation data may be communicated to the vehicle game server 20 via a wired or wireless connection. Data on the vehicle game server 20 may then transmitted, via a restricted primary wireless network 23 23, to a ride data server 22. In addition, or alternatively, the vehicle game clients 18 and/or the vehicle game server 20 may communicate lower priority highly detailed data directly to ride data server 22 via a secondary network 25, illustrated as an analytics wireless network. As mentioned above, the secondary network 25 may have higher bandwidth than the primary wireless network 23 23 to accommodate larger data set sizes. Moreover, the highly detailed data may provide a log of historical or more long-term perspectives of a respective component of the system 10. It should be noted that the vehicle game server 20 may also compile operation data from the vehicle game clients 18 into highly detailed data and then communicate it to the ride data server 22 via the secondary network.

In one embodiment, one or more components of the layered reporting system may collect and transmit highly detailed data, e.g., slow data, relating to the performance of the components. The highly detailed data may be collected by the vehicle game clients 18 of the ride vehicles 14 and then communicated to the secondary network 25 having a higher bandwidth than the primary wireless network 23, as mentioned above. It should be appreciated that the secondary network 25 may operate with closer radio and/or antenna proximity for effective communication, with line-of-sight communication, with slower handoffs between wireless access points, or any combination thereof, to accommodate the higher bandwidth. Via the secondary network 25, the highly detailed data from the ride vehicles 14 may be communicated to the ride data server 22. Highly detailed data may also be communicated from projection game clients 24 and/or a ride game server 26 to the ride data server 22. From the ride data server 22, the data may be uploaded to a cloud hosted analytics engine 28. It should be noted that if the restricted wireless network 23 is not available to transmit data, the data may be stored on the ride vehicles 14 until the data can be transmitted. Real-time data related to operation of the ride vehicles 14 may be sent to the ride data server 22 via the restricted wireless network 23, e.g., a primary wireless network of the attraction environment 12.

It should be noted that the restricted wireless network 23 is limited access, e.g., cannot be accessed by the riders within the attraction. The restricted wireless network may only require or operate using a low bandwidth, similar to that of standard Wifi. In addition, the health data of one or more projection game clients 24 may be sent to the ride game sever 26 and then to the ride data server 22 via a hardwired connection. Once at the ride data server 22, the data may be uploaded to the cloud hosted analytics engine 28.

As the riders travel through the attraction, the layered reporting system permits real-time data to be transmitted to the restricted primary wireless network 23. To manage the data load, the ride vehicles 14 may be equipped with data feedback mechanisms to limit data transmissions in order to preserve the primary wireless network 23 and/or the secondary network 25. Data load management may also be facilitated by positioning the ride vehicles 14 at various wireless access points throughout the ride, such that no one wireless access point is overwhelmed by an influx of data. The position of the ride vehicles 14 may be done automatically through ride logic, or manually when the ride is not operational. For example, the ride may not be operational between ride cycles or during an unloading/loading process for guests and when the ride vehicles 14 are generally stationary. In an embodiment, the ride logic operates to distribute ride vehicles 14 throughout a loading/unloading area to distribute data loads for different wireless access points in the area and based on a data volume to be transmitted. If one wireless access point is at capacity, the controller of the attraction can, in embodiments, instruct other ride vehicles to move autonomously to other locations associated with other wireless access points.

When the ride is not operational, highly detailed vehicle operation data may be transmitted over the primary network 23, the secondary network 25, or any combination thereof. In an embodiment, the highly detailed vehicle operation data is restricted to the secondary network 25 while the ride is operational, but can be communicated via the primary network when the ride is not operational. In an embodiment, communication from the system to the ride vehicle 14 can occur via the secondary network. In one example, such communications via the secondary network 25 to the ride vehicle 14 may modify the code/software generating the highly detailed vehicle operation data, configure the software generating the highly detailed vehicle operation data, or place data/logic on a ride vehicle that changes how data is interpreted. This can impact what data is considered fast and slow data and the frequencies in which the data is recorded/reported/sent/received. The highly detailed data may offer insight to larger and/or longer term problems that may arise during one or more ride-throughs. Further, the highly detailed data may relate to activities that are auxiliary to the ride, such as activities that are available for riders while they wait in a queue. For example, the ride may have sensors disposed throughout the queue that may detect signals from handheld devices that relate to the ride. The sensors may collect data relating to how often a rider interacts with activities while in the queue.

The ride data server 22 may also receive data from other components of the system, such as one or more projection game clients 24, via the primary wireless network 23. The projection game clients 24 may include any suitable projectors, augmented reality/virtual reality (AR/VR) headset, etc. The projection game clients may be distributed throughout the attraction, with the AR/VR headsets being located on the ride vehicles 14 and the projectors being part of the environment. In an embodiment, certain headset information may be generated and collected by the ride vehicle game client 18.

The projectors, the AR/VR headset, or other physical objects may be configured to send health data to the ride game server 26 via the primary wireless network 23. The operation data of the projection game clients 24 may include, but is not limited to, status, power levels, test logs, malfunction data, etc. In some embodiments, the data of the projection game clients 24 may be communicated to the ride game server 26 via a wired connection. For stationary projection game clients 24, the wired connection may run through or on the ground of the attraction environment to a central computing system. Mobile projection game clients 24 on the other hand, may be adapted to accommodate a wired connection, tethered to the ride vehicle 14. Additionally, or alternatively, the loading stations and/or maintenance bays (mentioned above) may include an adapter to connect to the AR/VR headset 34 to collect health data and communicate to the ride game server 26.

Once the data of the projection game clients 24 is communicated to the ride game server 26, it may then be communicated to the ride data server 22 via the primary wireless network 23. In addition, or alternatively, the projection game clients 24 may communicate highly detailed data directly to ride data server 22 via the secondary network 25. As mentioned above, the secondary network 25 has a higher bandwidth than the primary wireless network 23 to accommodate larger data set sizes. Moreover, the highly detailed data may provide a more long-term perspective of a respective component of the attraction environment. The ride game server 26 may also compile health data from the projection game clients 24 into highly detailed data and then communicate it to the ride data server 22 via the secondary network.

Once the data is at the ride data server 22, it may be uploaded to the cloud hosted analytics engine 28. Once the data is published into the cloud hosted analytics engine 28, artificial intelligence and/or machine learning algorithms are employed to understand baseline values, trends, and spot outliers. The artificial intelligence and/or machine learning may also predict if performance metrics might become outliers to facilitate pre-emptive maintenance and improve ride uptime and the rider's experience.

Figure 2:
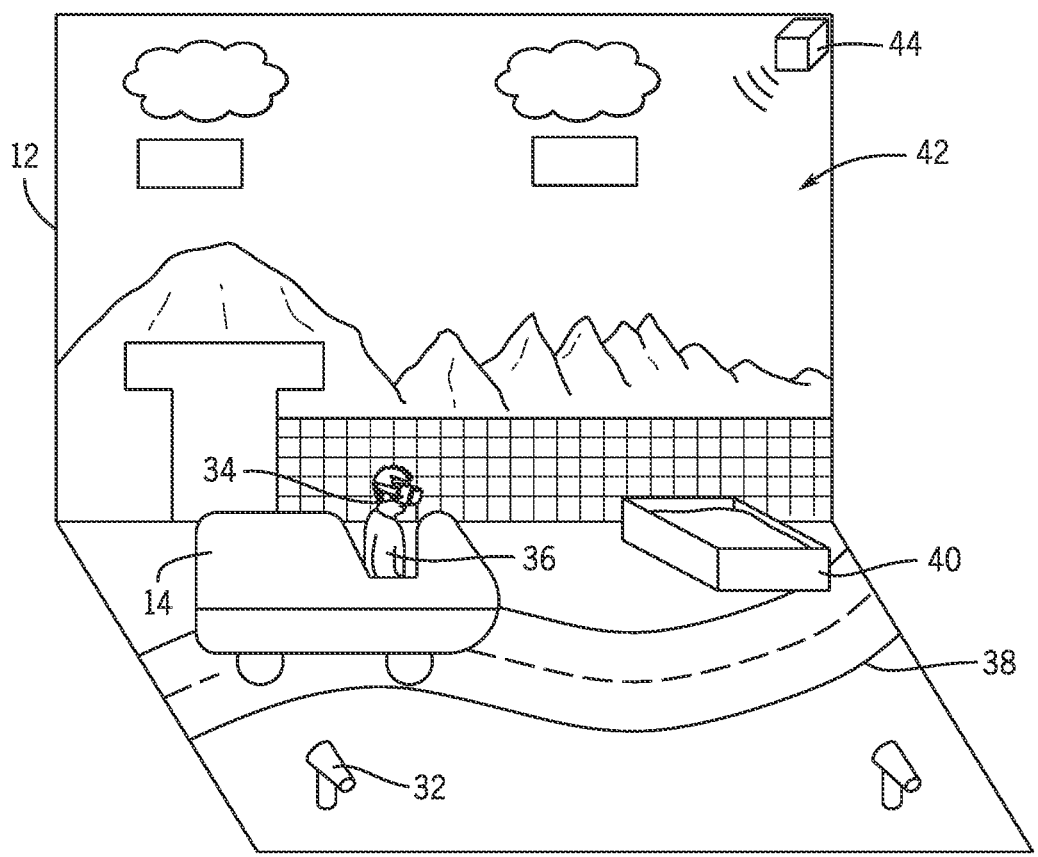
FIG. 2 is a perspective view of an attraction environment of the layered reporting system in accordance with an embodiment of the present disclosure.

The disclosed layered data reporting system may be used in conjunction with data generated by an attraction or other entertainment environment. As illustrated by FIG. 2, an attraction environment 12 may include one or more features that enhance an immersive experience and that generate related operation data that is provided to the layered data reporting system. For example, in one embodiment, one or more ride vehicles 14 traverse a ride path 38. The attraction environment 12 may include virtual game features such as those provided by projectors 32 onto a video display 42. The video display 42 may include various selectable virtual displayed features that are capable of being selected by a game player (e.g., guest 36) before the ride begins. The guest 36 may also be equipped with an augmented reality/virtual reality (AR/VR) headset 34. The AR/VR headset 34 may have a display that includes virtual display features resembling those on the video display 42. Both fast and slow operation data from the projectors 32, video display 42, and/or the AR/VR headset 34 may be provided to the projection game client 24. As discussed, certain AR/VR headsets 34 may be tethered to the ride vehicle 14, and their operation data may additionally or alternatively flow through the vehicle game client 18.

The guest 36 may interact with virtual display features displayed on the display of the AR/VR headset 34. The video projections may generate display instructions to display images in accordance with the environment 12. The images may be determined based on the guest's 36 position on the ride path 38. In addition, the same, similar, or additional visuals will be projected to a display on the AR/VR headset 34. This will allow the guest 36 to interact with objects within the attraction environment while also being able to see additional visuals that may not be physically present within the environment 12. Fast or high priority operation data collected by the projection game client 24 and provided to the ride data server 22 (FIG. 1) may include headset malfunction data, display malfunction data, or timing data indicative of coordination of the display with corresponding audio, video, or special effects. Slow or low priority operation data may include detailed gaze direction information, detailed image display data, interaction data In addition, the projection game clients 24 or other clients of the system 10 (see FIG. 1) may receive or collect operation data from interactive physical objects 40, e.g., surface features that can reflect projections in accordance with the environment, that form dynamic physical barriers, visual interest, or special effect devices such as water sprayers, fog machines, wind machines, etc. Such physical objects 40 may also include robotic figures. Fast or high priority operation data from the physical object may include malfunction data that requires rerouting of the ride vehicle 14, activation of alternate special effects, or disabling coordinated display sequences that are specific for or mapped onto the physical object as it moves. Slow or low priority operation data may include object movement tracking and object movement position relative to the ride vehicle 14, projection mapping data to assess the accuracy of projection mapped displays, or gaze direction information to determine if the physical object is of interest to the riders 36.

Figure 3:
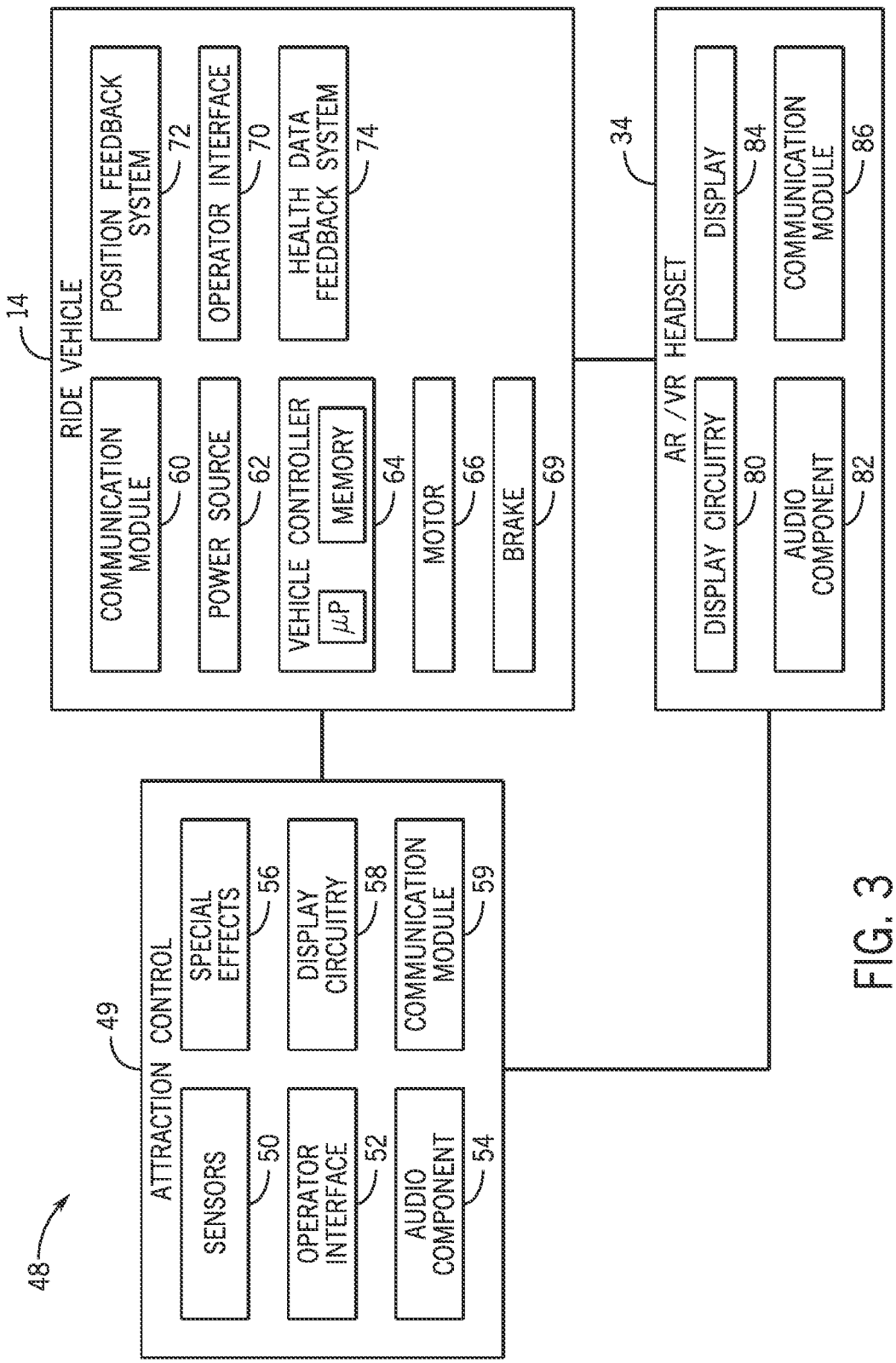
FIG. 3 is a block diagram of components within the layered reporting system in accordance with an embodiment of the present disclosure.

The layered reporting system 10 (see FIG. 1) may be implemented for data reporting of operation data from an attraction (e.g., the attraction environment 12 of FIG. 2). FIG. 3 is a block diagram of an attraction system 48 that may collect or receive operation data for reporting via the reporting system 10. The system 48 includes an attraction controller 49 that is communicatively coupled to one or more ride vehicles 14, and one or more AR/VR headsets 34. The controller 49 may be communicatively coupled to other elements within the environment 12 as provided herein. The controller 49 may include separate control circuitry for facilitating interactive and dynamic elements, including display circuitry 58. Additionally, the controller 49 may include or be communicatively coupled to tags or sensors 50 used for tracking the ride vehicle 14, an input device of the operator interface 52, an audio component 54, a special effect controller 56 for controlling one or more physical effects (e.g., interactive physical objects 40; see FIG. 2), and a communication module 59 for communicating the fast and/or slow data. One or more disclosed features of the controller 49 may alternatively be implemented in the vehicle 14.

In some embodiments, the controller 49 may send instructions to the ride vehicle 14 via the secondary network 25 when the ride is operational. The instructions may include, but are not limited to, instructions on how to collect data and/or instructions on determining if the collected data is fast data, or slow data. The determination of whether the data collected by a health data feedback system 74 of the ride vehicle 14 is fast data or slow data, may increase the efficiency of the layered reporting system 10.

The ride vehicle 14 may include components that generate operation data, such as a motor 66 and a brake 68. The movements of the ride vehicle 14 may include running (e.g., acceleration, deceleration), turning, and stopping of the ride vehicle 14. The motor 66 may be powered by any suitable power source 62, including, but not limited to, a battery, a solar panel, an electrical generator, a gas engine, or any combination thereof. The operations of the motor 66 and the brake 68 may be controlled by a vehicle controller 64. For example, the vehicle controller 64 may control the motor 66 to adjust its output power to accelerate or decelerate the ride vehicle 14. The vehicle controller 64 may also control the brake 68 to decelerate or stop the ride vehicle 14. Further, the vehicle controller 64 may operate under instructions from the player via an operator interface 70 (e.g., to steer the vehicle based on operator control of a steering wheel or joystick). The operation data generated by components of the ride vehicle 14 is reported to the layered reporting system as provided herein. In one example, fast or higher priority data may include speeds outside of tolerances, while slow or lower priority data may include power fluctuations of the motor 66 that may be flagged for future maintenance.

The ride vehicle 14 may include a position feedback system 72 for monitoring its position in the attraction. In one embodiment, the position feedback system 72 interacts with one or more sensors or tags 50. The vehicle position feedback system 72 may include a reader that may sense the sensors or tags 50 to provide the position information of the ride vehicle 14. The reader then supplies the position information to the vehicle controller 64, which in turn is then communicated to the vehicle game server 20 (FIG. 1) via a communication module 60. Additionally, a health or operation data feedback system 74 may include sensors or tags that collect real time health data of the ride vehicle 14. The communication module 60 may also facilitate communication with the vehicle game server 20 to facilitate transmitting health data from the health data feedback system 74. In this manner, the real time health data of the ride vehicle 14 may be communicated to the vehicle game server 20, and ultimately the ride data server within a short time interval (e.g., 1 s, 2 s, 3 s, etc.). In the case of the primary wireless network 23 being unavailable, the real time operation data may be stored in a memory of the vehicle controller 64 until the primary wireless network 23 is available.

Additionally, or alternatively, when the primary wireless network 23 is not available, the real time health data may be communicated to the ride data server 22 via the secondary network 25. The highly detailed data from the ride vehicle 14 may also be communicated to the ride data server 22, via the secondary network, when the attraction is non-operational. In some embodiments, the highly detailed data may be communicated to the ride data server, via the primary wireless network 23, if bandwidth available.

The attraction environment may include various components that may allow for interaction of the riders 36 with the attraction environment and the ride vehicle 14. Specifically, the AR/VR headsets 34 may include display circuitry 80 that may present visualizations to a display 84. The visualizations may be the same or similar to the visualizations on the video display 42. The AR/VR headsets 34 may also include an audio component 82 that may project the same or similar audio to that of the audio component 54 of the attraction environment. This allows for the riders 36 to have an immersive ride experience and increase the enjoyment of the ride.

The AR/VR headsets 34 may also include a communication module 86. It should be noted that the communication module 86 may be the same or similar to that of the communication modules 59, 60, as described above. The communication module 86 may communicate real time health data of the AR/VR headsets 34 to the ride game server 26 via the primary wireless network 23, which then will be communicated to the ride data server 22 to be uploaded to the cloud hosted analytics engine 28. Alternatively, or additionally, the communication module 86 may communicate highly detailed data directly to the ride data server 22, via the secondary network, to be uploaded to the cloud hosted analytics engine 28. The AR/VR headsets 34 may be communicatively coupled to the ride vehicle 14 such that in the case of the primary and secondary networks being unavailable, the AR/VR headsets real time health data and highly detailed data may be stored in the memory of the vehicle controller 64.

In addition to being communicatively coupled to the ride vehicle 14, the AR/VR headsets 34 may be physically tethered to the ride vehicle 14. The connection may be facilitated via any suitable form of wiring that may allow for information to be communicated over. In certain embodiments, the power source 62 may also provide power to the AR/VR headsets 34 when the AR/VR headsets 34 are tethered to the ride vehicle 14.

Figure 4:
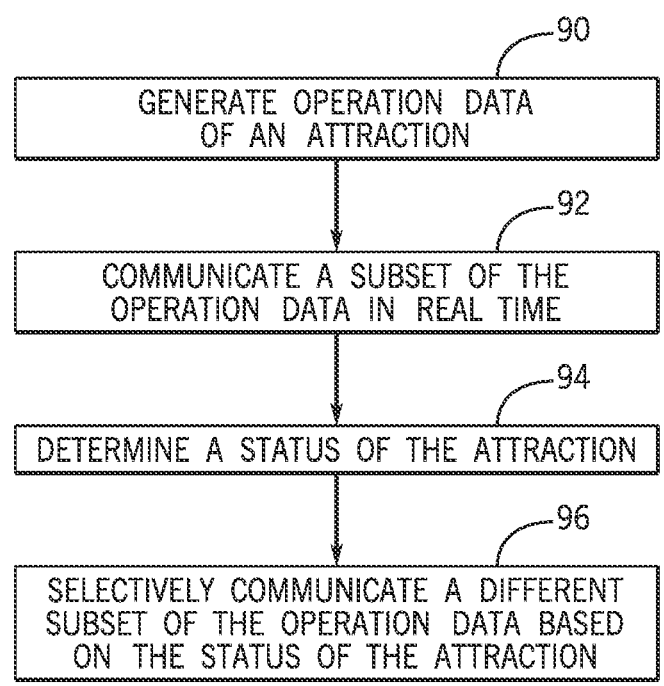
FIG. 4 is a flow diagram of a method for data transmission based on the operation status of the layered reporting system in accordance with present techniques.

FIG. 4 is a flow diagram of a method of data reporting. First, components within the attraction (e.g., ride vehicles 14, AR/VR headsets 34, animatronics, etc.) may generate, collect, and store operation data, which includes a first subset of higher priority data and a second subset of data that is highly detailed and lower priority operation data, or any combination thereof, as indicated by block 90. Each component may include elements configured to generate, collect, and store data. For example, the vehicle controller 64 may generate, collect, and store data. While controllers are not pictured in other components shown in FIG. 3, it should be noted that the components within the attraction, including but not limited to, ride vehicles 14, AR/VR headsets 34, may include elements similar to that of the vehicle controller 64 such as a suitable memory capable of storing data and instructions, as well as a processor configured to generate data and execute the instructions stored within the memory. A subset of the operation data, the first subset, is automatically communicated in real-time as it is generated, independent of an attraction status (block 92).

Responsive to collection of operation data, the system 10 may determine an attraction status, such as whether the attraction is operational, as indicated by block 94. The attraction status may be operational while the ride vehicles are in motion during an attraction cycle or non-operational, e.g., in a time period between cycles of the attraction or when the ride vehicles are in motion or on a ride path. When the ride is operational, the system 10 transmits the high priority operation data via the primary wireless network 23. The primary wireless network 23 may only transmit the real time operation data because of limited bandwidth, in contrast to data transmission protocols for the secondary network, which transmits logged data that is more data intensive and that may be batch transmitted via the secondary network when the ride is non-operational.

When the status is not operational, components within the attraction may generate, collect, and store no or very limited new operation data. However, the data stored within the respective memories of the components within the attraction during the ride cycle may be transmitted via the secondary network. Additionally, or alternatively, the data transmission of the real time data may be delayed to allow for the highly detailed data to be transmitted via the secondary network with priority, as indicated by block 96. The data transmission delay may also occur when the primary wireless network 23 and/or the secondary network are unavailable.

In some embodiments, both the primary and secondary networks are available and transmit data, whereby the primary wireless network 23 may transmit only real time operation data, and the secondary network may transmit highly detailed data on real time or on a delayed or periodic schedule. The higher priority and lower priority data may be combined and then uploaded to the cloud hosted analytics engine 28. The cloud hosted analytics engine 28 may be used to make decisions pertaining to the attraction based on real time health data, highly detailed data, or any combination thereof.

The lower priority and higher priority data may be combined based on time stamp information or data source or origin (e.g., power data from vehicle power system). In embodiments, the higher priority data may be present in the lower priority data, but in a more data-intensive form in the lower priority data.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A data reporting system for an attraction, the data reporting system comprising:
    a primary wireless communication network;
    a secondary wireless communication network separate from the primary wireless network, wherein the primary wireless network comprises access-restricted communication pathways and is configured to transmit data faster than the secondary wireless network; and
    a ride vehicle of the attraction, the ride vehicle comprising:
        a controller of the ride vehicle configured to provide ride vehicle operation data indicative of characteristics of the ride vehicle during operation; and
        communication circuitry that communicates a first subset of the ride vehicle operation data to the primary wireless network and a second subset of the ride vehicle operation data to the secondary wireless network.

2. The data reporting system of claim 1, wherein the primary wireless communication network does not receive data that is communicated via the secondary wireless network.

3. The data reporting system of claim 1, wherein the first subset of the ride vehicle operation data comprises real-time ride vehicle operation data.

4. The data reporting system of claim 1, comprising:
    a data server that receives the first subset of the ride vehicle operation data from the primary wireless network and the second subset of the ride vehicle operation data from the secondary wireless network.

5. The data reporting system of claim 1, comprising:
a display controller comprising configured to execute to:
transmit images to a AR/VR headset, wherein the AR/VR headset is coupled to the ride vehicle.

6. The data reporting system of claim 5, wherein the AR/VR headset generates headset operation data, wherein a portion of the headset operation data is provided to the controller of the ride vehicle as part of the first subset of the ride vehicle operation data.

7. The data reporting system of claim 5, wherein the AR/VR headset comprises headset communication circuitry that receives the transmitted images and that communicates headset operation data comprising a first portion of headset operation data and a second portion of the headset operation data to the secondary wireless network, wherein the first portion of the headset operation data is structured to facilitate faster communication than the second portion of the headset operation data.

8. The data reporting system of claim 7, wherein the display controller receives the headset operation data and separates the data in the first portion and the second portion.

9. The data reporting system of claim 8, wherein the display controller communicates the first portion of the headset operation data via the primary wireless network.

10. The data reporting system of claim 1, wherein the first subset of the ride vehicle operation data comprises position data of the ride vehicle.

11. The data reporting system of claim 1, comprising a plurality of sensors configured to detect guest interactions, wherein the plurality of sensors generate guest data that is communicated to a data server via the secondary wireless network.

12. The data reporting system of claim 1, wherein the first subset of the ride vehicle operation data has a higher priority than the second subset of the ride operation data.

13. The data reporting system of claim 1, wherein the first subset of the ride vehicle operation data comprises compressed ride vehicle operation data.

14. The data reporting system of claim 1, wherein the first subset of the ride vehicle operation data comprises health data related to the ride vehicle, wherein the health data comprises operation status, malfunction identification, position data, speed, status of riders, sensor measurements, status of coupled devices, or a combination thereof.

15. The data reporting system of claim 1, comprising an attraction controller communicatively coupled to the ride vehicle, wherein the controller of the ride vehicle is configured to determine whether a portion of the ride vehicle operation data belongs to the first subset of the ride vehicle operation data or the second subset of the ride vehicle operation data based on instructions from the attraction controller.

16. A method of data reporting for an attraction, the method comprising:
generating ride vehicle operation data indicative of characteristics of a ride vehicle of the attraction during operation;
communicating a first subset of the ride vehicle operation data via a primary wireless communication network; and
communicating a second subset of the ride vehicle operation data via a secondary wireless network separate from the primary wireless network, wherein the primary wireless network comprises access-restricted communication pathways and is configured to transmit data faster than the secondary wireless network.

17. The method of claim 16, wherein the primary wireless network is a dedicated wireless network for the first subset of ride vehicle operation data.

18. The method of claim 16, comprising:
determining that the primary wireless network is not available to communicate the portion of the first subset of the ride vehicle operation data; and
communicating the portion of the first subset of the ride vehicle operation data via the secondary wireless network.

19. The method of claim 16, comprising:
determining that the primary wireless network is not available to communicate the portion of the first subset of the ride vehicle operation data; and
storing the portion of the first subset of the ride vehicle operation data on the ride vehicle until the primary wireless network becomes available.

20. The method of claim 16, comprising:
compressing a portion of the ride vehicle operation data to generate a compressed portion of the ride vehicle operation data; and
communicating the compressed portion of the ride vehicle operation data as the first subset of the ride vehicle operation data via the primary wireless network.

21. The method of claim 16, comprising:
compiling a portion of the ride vehicle operation data to generate a compiled portion of the ride vehicle operation data; and
communicating the compiled portion of the ride vehicle operation data as the second subset of the ride vehicle operation data via the secondary wireless network.

* * * * *